United States Patent [19]

Okada

[11] 4,039,708
[45] Aug. 2, 1977

[54] COMBINATION BOARD

[76] Inventor: Kikuji Okada, 3-11, 5-chome, Asagayakita, Suginami, Tokyo, Japan

[21] Appl. No.: 536,866

[22] Filed: Dec. 27, 1974

[30] Foreign Application Priority Data

Dec. 28, 1973 Japan .................. 48-144656

[51] Int. Cl.² .......................... B65D 5/50; B32B 3/12; B32B 3/28
[52] U.S. Cl. .................................. 428/73; 206/521; 229/14 C; 229/28 R; 428/178; 428/182; 428/186; 428/131
[58] Field of Search .................. 428/178–179, 428/182, 184, 185, 186, 131, 133, 72, 73; 229/14 C, 28 R, 49; 206/521

[56] References Cited
U.S. PATENT DOCUMENTS

| 269,816 | 12/1882 | Hamilton | 428/184 |
| 1,077,322 | 11/1913 | Ward | 229/28 R |
| 1,870,681 | 8/1932 | Hamersley | 428/184 |
| 2,888,134 | 5/1959 | Van Antwerpen | 229/14 C |
| 3,101,166 | 8/1963 | Van Antwerpen | 229/14 C |
| 3,362,609 | 1/1968 | Freedy | 229/14 |
| 3,793,791 | 2/1974 | Wootten | 229/49 X |
| 3,950,585 | 4/1976 | Hale | 428/179 X |
| 3,952,077 | 4/1976 | Wigley | 428/178 X |
| 3,961,119 | 6/1976 | Thomas | 428/178 |
| 3,969,563 | 7/1976 | Hollis | 428/178 X |
| 3,980,221 | 9/1976 | Okada | 229/28 R |
| 3,982,057 | 9/1976 | Briggs et al. | 428/73 |

Primary Examiner—Harold Ansher
Attorney, Agent, or Firm—Birch, Stewart, Kolasch and Birch

[57] ABSTRACT

The present invention provides a combination board or plate made of a relatively small quantity of material and yet having a considerable thickness, a great load carrying capacity, a cushioning action and a ventilating ability.

11 Claims, 8 Drawing Figures

U.S. Patent  Aug. 2, 1977  Sheet 1 of 3  4,039,708
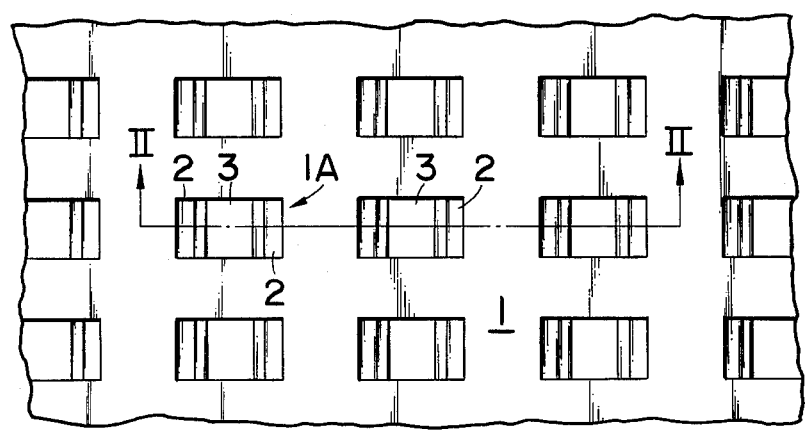
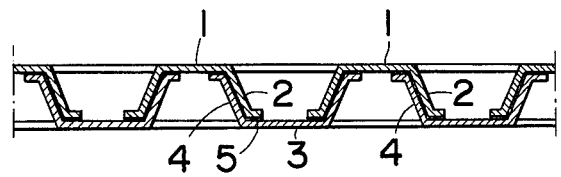
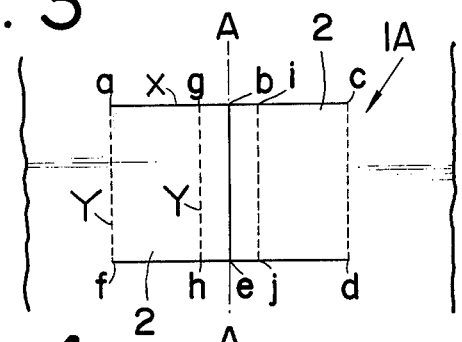
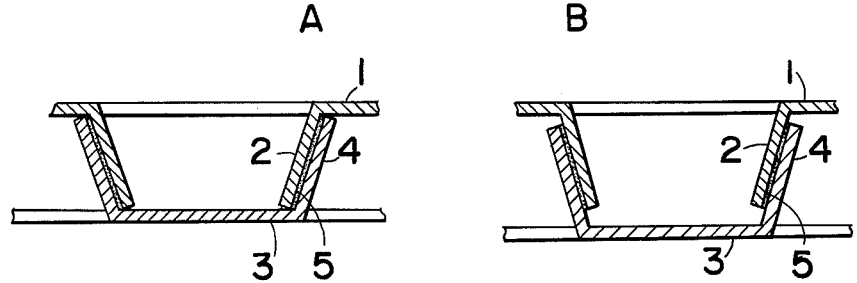

FIG. 8
(A) 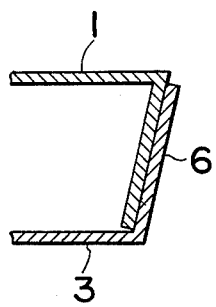
(B) 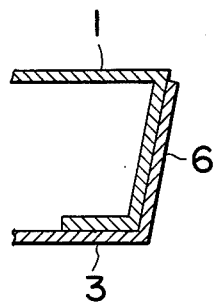
(C) 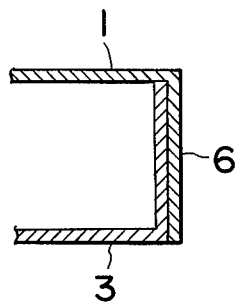
(D) 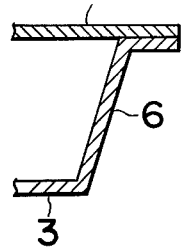
(E) 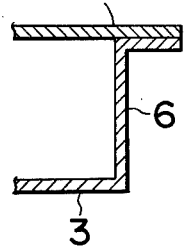
(F) 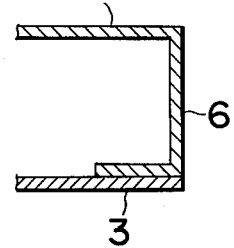
(G) 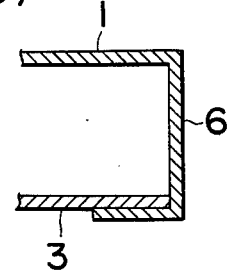
(H) 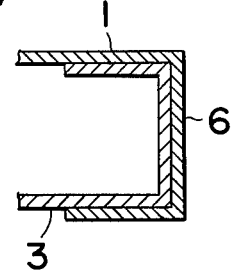

COMBINATION BOARD

BACKGROUND AND SUMMARY OF THE INVENTION

The present invention relates to a combination board or plate and more specifically to a board fabricated by integrally uniting an upper board having a plurality of openings with downwardly slanted or inclined spacer fins and a lower board having corresponding openings with upwardly slanted or inclined fins, said fins of the two boards being arranged alternately and glued, welded, or otherwise joined together in a back to back relationship.

While a variety of cushioning boards of this kind have heretofore been proposed, none have proved practically useful. The present invention eliminates the prior art disadvantages and brings about improvements over the prior art structures. Thus it is an object of the present invention to provide a combination board made of a relatively small quantity of material and yet having considerable thickness, great load carrying capacity, cushioning action, and ventilating ability.

Another object of the present invention is to provide a combination board which is made with utmost ease not only from paperboard, pasteboard, or cardboard but also from plastics, metal or other plates.

Still another object of the present invention is to provide a combination board whose upper or lower board is formed of cardboard or corrugated board and waxed particularly for moisture-proof applications.

Still a further object of the present invention is to provide a combination board whose upper or lower board has greater strength than the other so that the latter can provide a cushioning action.

Yet another object of the present invention is to provide a combination board in which the downwardly or upwardly extending slanted spacer fins of the upper or lower board are of a "H", "U", "V" configuration or other suitably chosen shape in cross section and are symmetrically joined back to back to the corresponding fins of the other board.

An additional object of the present invention is to provide a combination board for use as "throw-away" packings or pallets, with its upper or lower board being made of paperboard.

A further object of the present invention is to provide a combination board useful as packing materials, such as pallet, upper protector, or side dunnages, or as ordinary panel structures, or as part of partition walls, slide screens or the like for the building industry.

These and other objects and advantages of the present invention will become apparent from the following description taken in connection with the accompanying drawings, wherein:

FIG. 1 is a fragmentary plan view of a combination board embodying the invention;

FIG. 2 is a sectional view taken along the line II—II of FIG. 1;

FIG. 3 is a view explanatory of the way in which the upper board is formed with spacer fins;

Figure 5:
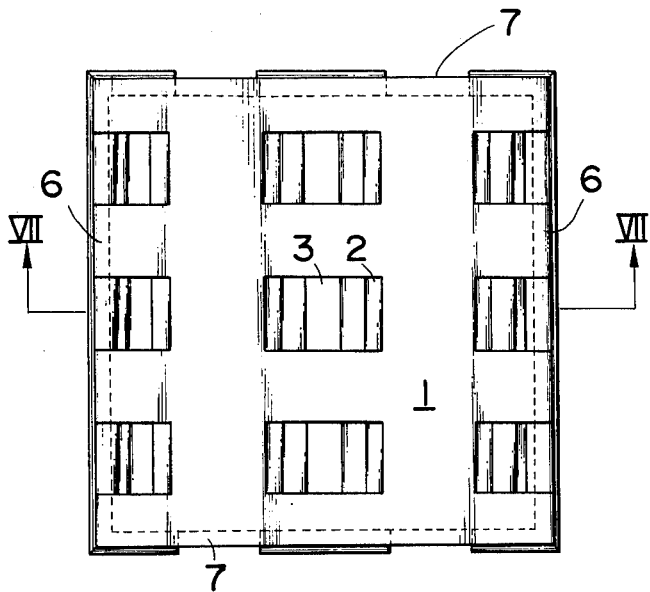
Figure 6:
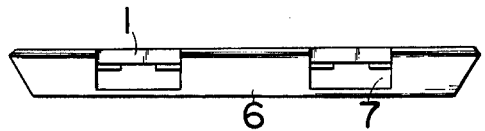
Figure 7:
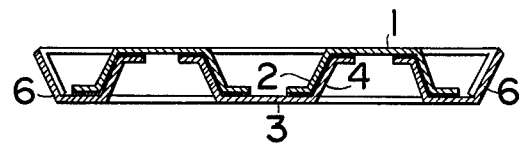

FIGS. 4(A) and (B) show two other forms of the fins in a U shape and H shape, respectively;

FIG. 5 is a plan view of a combination board according to the present invention for use as a pallet;

FIG. 6 is a front view of the board of FIG. 5;

FIG. 7 is a sectional view taken along the line VII—VII of FIG. 5; and

FIGS. 8(A) through (H) are sectional views of different side wall structures for pallets fabricated in conformity with the present invention.

Referring to the drawings, wherein like numerals designate like or corresponding parts throughout, there is shown as a plan view in FIG. 1 an upper board 1 and a lower board 3 made of paperboard, pasteboard, cardboard, plastics, metal or the like, formed with downwardly slanted spacer fins 2. FIG. 2 is a section taken along II—II of FIG. 1 and shows, in cross section, the upper board 1, the lower board 3, spacer fins 2 which extend from the upper board and spacer fins 4 which extend from the lower board. Corresponding spacer fins 2 and 4 are fixed together to provide a supporting and cushioning structure. As shown best in FIG. 3, the fins 2 are formed by cutting a fragmentary area 1A of the upper board 1 on lines a-b-e-f and c-b-e-d indicated by full lines (X), overlapping at the centerline A—A, or in the pattern of letter H on its side, and then folding the fins thus obtained obliquely downward and further folding them back along lines a-f, c-d and g-h, i-i j indicated by broken lines (Y), respectively, to be parallel to the upper board surface. Also shown is a lower board 3, which may or may not be made of the same material as the upper one. It is held substantially in parallel to the upper board and has similar spacer fins 4 slanted upward into engagement with the downwardly folded fins 2, at such an angle to the overlying board as to keep the both boards apart a substantially equal distance throughout. The fins 4 are glued or welded to those of the upper board. Layers of suitable adhesive are indicated at 5.

Other forms of the spacer fins 2, 4 are shown in FIGS. 4(A) and (B). In FIG. 4A, the spacer fins traverse the entire distance between the upper and lower boards whereas in FIG. 4B the spacer fins extend only a major portion of the distance between said boards.

FIGS. 5 through 7 illustrate another embodiment of the present invention intended for ue as a pallet. Here, numeral 6 designates side walls formed by folding the marginal areas of the upper and lower boards and joining the resulting fins on all sides together by the application of adhesive or by welding. Openings 7 are provided on all four sides to receive the fork of a forklift truck.

FIGS. 8(A) to (H) give some exemplary sectional contours of the pallet side walls incorporating the invention. The contour shown in FIG. 8(E) is useful for so-called shrink unit load pallets. A cornerless contour enables a light load to be effectively used.

The invention is illustrated by the following examples.

EXAMPLE 1

A combination board, having a configuration of FIG. 4B and measuring 1100 mm long, 800 mm wide, and 75 mm high, was made from upper and lower corrugated boards. The combination board weighed 1.1 kilogram per square meter. In load tests conducted at 20° C, RH 65% and using an oil pressure pump of 5 tons, it was proved that the combination board was capable of supporting static uniform loads up to about 3.75 tons and an appeared stain of about 9 mm.

EXAMPLE 2

Using the boards of the same material as in Example 1, a pallet made of combination board measuring 820 mm long, 710 mm wide, and 66 mm high, was tested under the same conditions as Example 1 and was proven to be capable of supporting static uniform loads up to about 1.24 tons.

While the invention has been described with reference to preferred embodiments thereof, it will be obvious to those skilled in the art that various changes and modifications may be made without departing from the spirit and scope of the invention as hereinafter claimed.

What is claimed is:

1. A combination board comprising an upper board having a plurality of openings therein with downwardly slanted spacer fins extending from said openings and a lower board having a plurality of openings therein with upwardly slanted, matching spacer fins extending from said openings, said fins of the two boards being arranged alternately and joined together back to back to provide an integral structure of repeating trapezoidal shapes in the longitudinal cross section with the openings in said boards being in an alternate arrangement, and said upper or lower boards being constituted of a material selected from the group consisting of cardboard and corrugated board and said combination board is provided with a wax coating for moisture-proof applications.

2. A combination board comprising an upper board having a plurality of openings therein with downwardly slanted spacer fins extending from said openings and a lower board having a plurality of openings therein with upwardly slanted, matching spacer fins extending from said openings, said fins of the two boards being arranged alternately and joined together back to back to provide an integral structure of repeating trapezoidal shapes in the longitudinal cross section with the openings in said boards being in an alternate arrangement, the marginal walls of the upper and lower boards being folded in the downward and upward directions, respectively, and joined together to form side walls having openings therein.

3. The combination board according to claim 2, wherein the upper and lower boards are constituted of a material selected from the group consisting of paperboard, pasteboard, cardboard, a plastic, and a metal.

4. The combination board of claim 2, wherein the spacer fins extend a major portion of the distance between the upper and lower boards.

5. The combination board of claim 4, wherein the spacer fins are slanted from the vertical plane.

6. A combination board comprising an upper board having a plurality of openings therein with downwardly slanted spacer fins extending from said openings and a lower board having a plurality of openings therein with upwardly slanted, matching spacer fins extending from said openings, said fins of the two boards being arranged alternately and joined together back to back to provide an integral structure of repeating trapezoidal shapes in the longitudinal cross section with the openings in said boards being in an alternate arrangement, said spacer fins extending the entire distance between the upper and lower boards.

7. The combination board according to claim 6, wherein one of the boards has a greater physical strength than the other board so that a cushioning action is attained.

8. The combination board according to claim 6, wherein the downwardly and upwardly slanted fins of the upper and lower boards have corresponding "H", "U" or "V" shape cross sectional configurations and are alternately and symmetrically joined back to back to the corresponding fins of the other board.

9. The combination board of claim 6, wherein the spacer fins are slanted from the vertical plane.

10. A combination board comprising an upper board having a plurality of openings therein with downwardly slanted spacer fins extending from said openings and a lower board having a plurality of openings therein with upwardly slanted, matching spacer fins extending from said openings, said fins of the two boards being arranged alternately and joined together back to back to provide an integral structure of repeating trapezoidal shapes in the longitudinal cross section with the openings in said boards being in an alternate arrangement, and said spacer fins being longer than the distance between the upper and lower boards, the excess length of said spacer fins extending from the upper board being fixed to the lower board and the excess length of said spacer fin extending from the lower board being fixed to the upper board.

11. The combination board of claim 10, wherein the spacer fins are slanted from the vertical plane.

* * * * *